US008794530B2

(12) United States Patent
Holmes et al.

(10) Patent No.: US 8,794,530 B2
(45) Date of Patent: Aug. 5, 2014

(54) OPTICALLY VARIABLE MAGNETIC STRIPE ASSEMBLY

(75) Inventors: Brian William Holmes, Hampshire (GB); Mark Deakes, Berkshire (GB)

(73) Assignee: Opsec Security Group Inc., Denver, CO (US)

( * ) Notice: Subject to any disclaimer, the term of this patent is extended or adjusted under 35 U.S.C. 154(b) by 830 days.

(21) Appl. No.: 12/735,077

(22) PCT Filed: Jan. 23, 2008

(86) PCT No.: PCT/GB2008/000233

§ 371 (c)(1),
(2), (4) Date: Sep. 15, 2010

(87) PCT Pub. No.: WO2009/092984

PCT Pub. Date: Jul. 30, 2009

(65) Prior Publication Data

US 2011/0011937 A1 Jan. 20, 2011

(51) Int. Cl.

*G06K 19/02* (2006.01)
*B42D 15/00* (2006.01)
*B42D 15/10* (2006.01)

(52) U.S. Cl.

CPC ........ *B42D 15/0013* (2013.01); *B42D 2035/24* (2013.01); *B42D 15/10* (2013.01); *B42D 2033/16* (2013.01)

USPC ........................................... 235/488; 235/493

(58) Field of Classification Search

USPC .......... 235/488, 487, 492, 379, 380; 349/113; 359/5, 1, 2

See application file for complete search history.

(56) References Cited

U.S. PATENT DOCUMENTS

| | | | | |
|---|---|---|---|---|
| 4,631,222 | A | 12/1986 | Sander | |
| 4,684,795 | A | 8/1987 | Colgate, Jr. | |
| 5,383,687 | A | 1/1995 | Suess et al. | |
| 5,428,479 | A * | 6/1995 | Lee | 359/567 |
| 5,786,587 | A * | 7/1998 | Colgate, Jr. | 235/487 |
| 5,811,775 | A * | 9/1998 | Lee | 235/457 |
| 2003/0058491 | A1* | 3/2003 | Holmes et al. | 359/2 |
| 2003/0133063 | A1* | 7/2003 | Kwok et al. | 349/113 |
| 2003/0164611 | A1* | 9/2003 | Schneider et al. | 283/57 |
| 2005/0012326 | A1* | 1/2005 | Keller et al. | 283/94 |
| 2006/0018021 | A1* | 1/2006 | Tomkins et al. | 359/573 |
| 2008/0258456 | A1* | 10/2008 | Rahm et al. | 283/85 |

FOREIGN PATENT DOCUMENTS

| | | | |
|---|---|---|---|
| EP | 1 435 547 | A1 | 7/2004 |
| EP | 1 674 282 | A2 | 6/2006 |
| WO | WO 2007/080389 | A2 | 7/2007 |
| WO | WO 2007/097775 | A1 | 8/2007 |

OTHER PUBLICATIONS

Optically Variable Devices (OVDs)—a revolution in anti-counterfeiting technology http://www.csiropedia.csiro.au/display/CSIROpedia/Optically+Variable+Devices.*

International Search Report issued in International Patent Application No. PCT/GB2008/000233 on Sep. 3, 2008.

Written Opinion of the International Searching Authority issued in International Patent Application No. PCT/GB2008/000233 on Sep. 3, 2008.

* cited by examiner

*Primary Examiner* — Sonji Johnson
(74) *Attorney, Agent, or Firm* — Oliff PLC

(57) ABSTRACT

An optically variable magnetic stripe assembly comprises a magnetic layer (5); an optically variable effect generating layer (1) over the magnetic layer; and a metallic reflecting layer (3) adjacent the optically variable effect generating layer and comprising an array of spaced metallic regions shaped as regular polygons.

21 Claims, 10 Drawing Sheets

Example of an ATM card with OVM stripe in which the gap is varied to optimise optical and breakdown properties

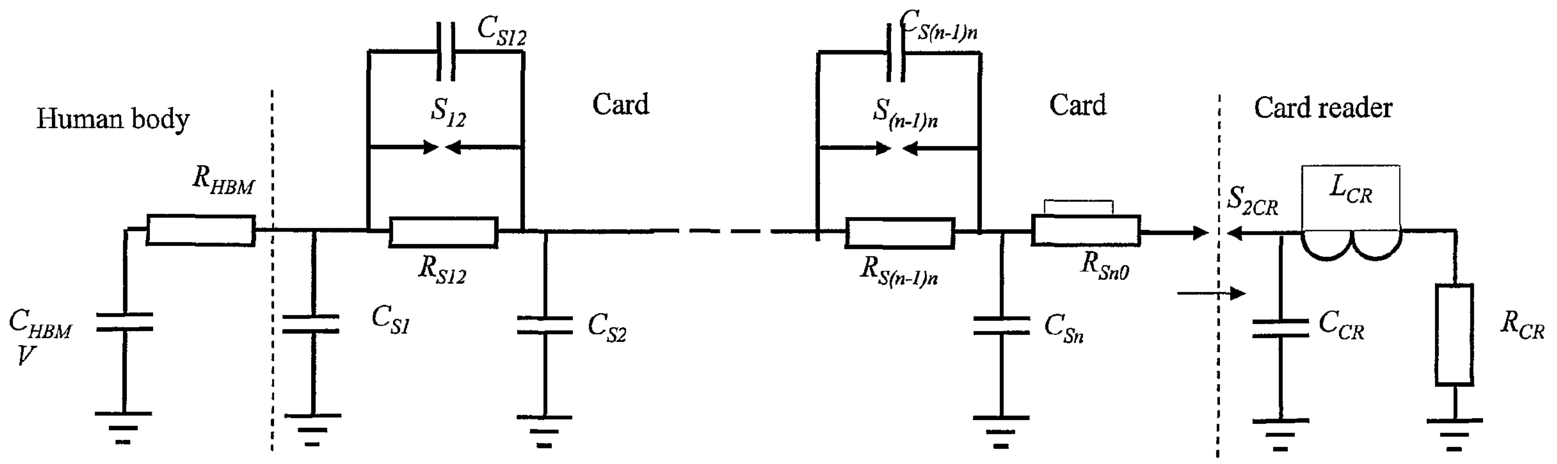
Figure 2 - A simplified electronic model of a person inserting an ATM card into a card reader. In this example the card stripe has multiple conductive cells *CS1* to *CSn* with isolating gaps between stripe cells and intercellular capacitance *CS12* to *CS(n-1)n*.

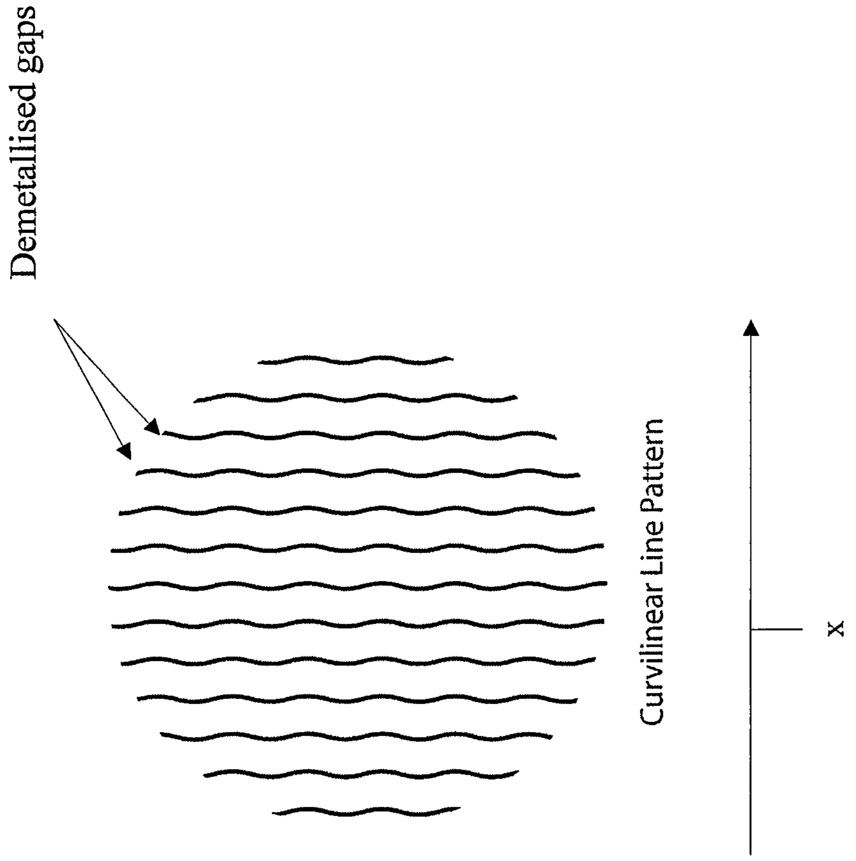
Figure 3. Example of a curvi-linear metal screen pattern

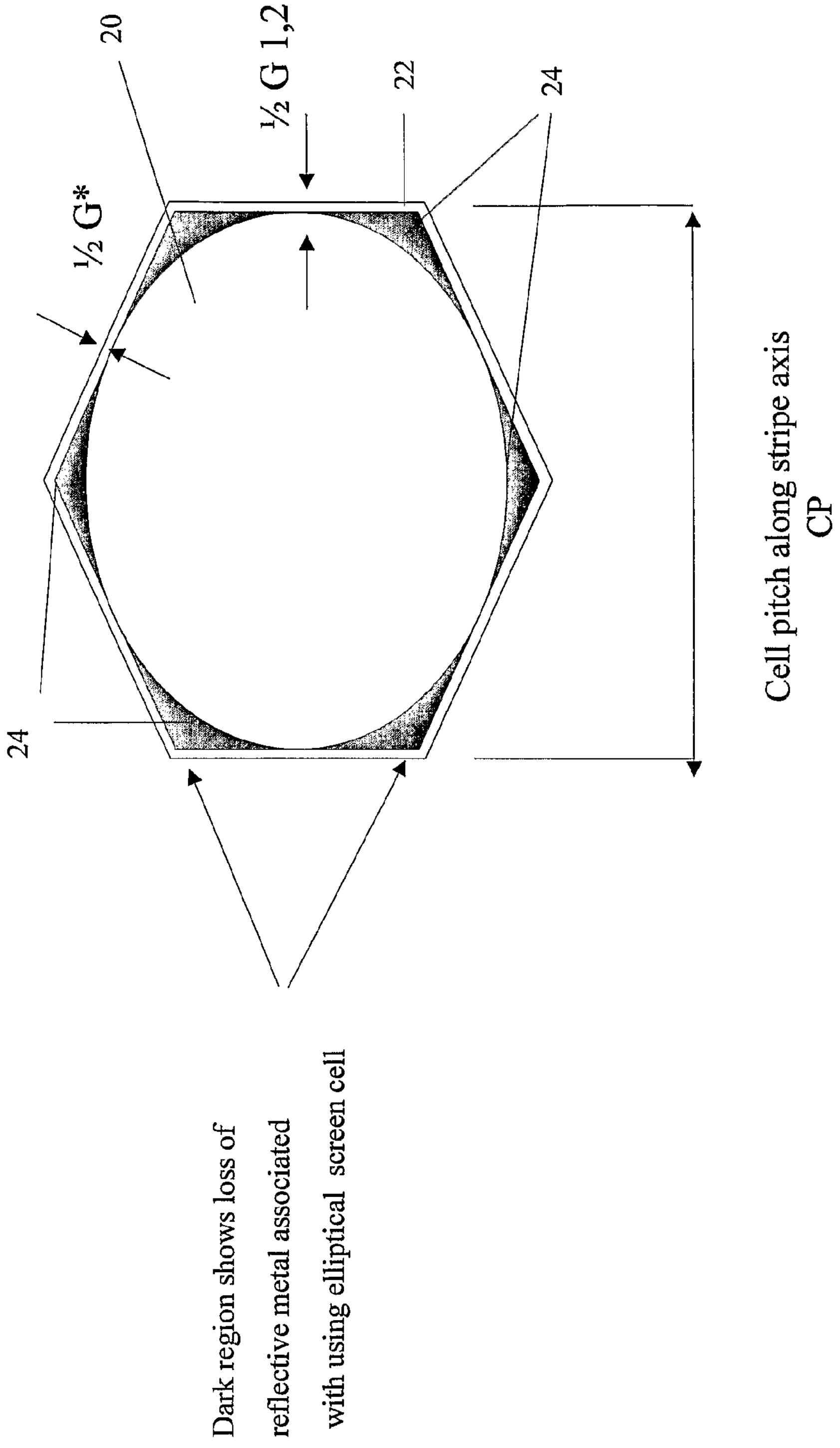
Figure 4. Illustrating difference in the metal fill factor between hexagon and ellipse in the context of minimal Gap

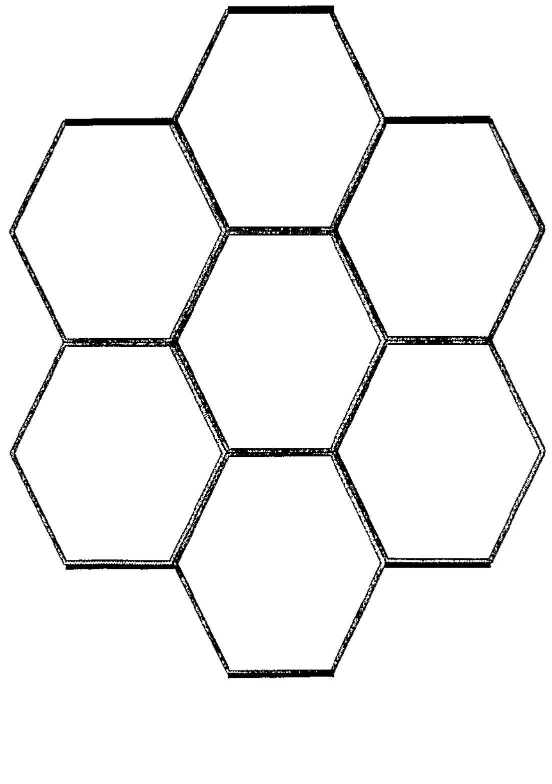
(a)
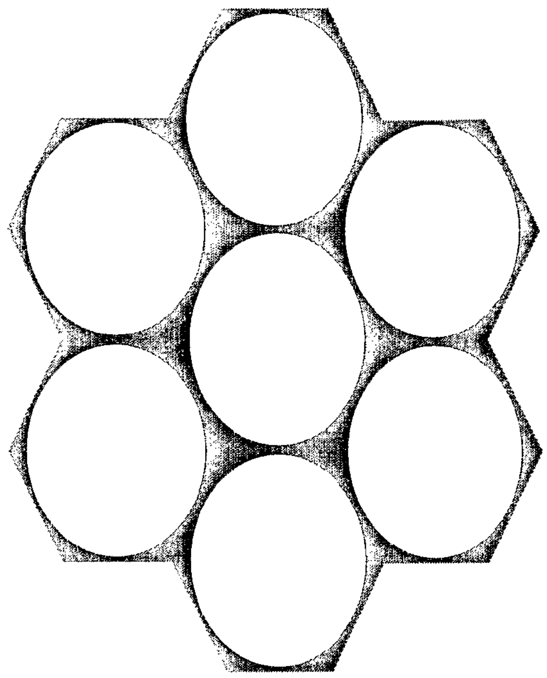
(b)
Figure 5. Illustration comparing the preferred hexagonal screen with elliptical screen
The dark zones define regions where metal has been removed (demetallised) – no hologram image is visible in dark demetallised zones

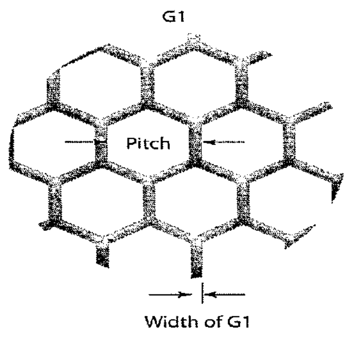
a). Showing larger gap G1 designed to increase breakdown voltage
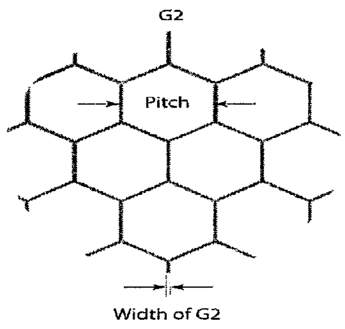
b). Showing smaller gap G2 designed to improve optical qualities whilst retaining breakdown resistance
Figure 6. Example of a hexagonal pattern of spark gaps between conducting cells

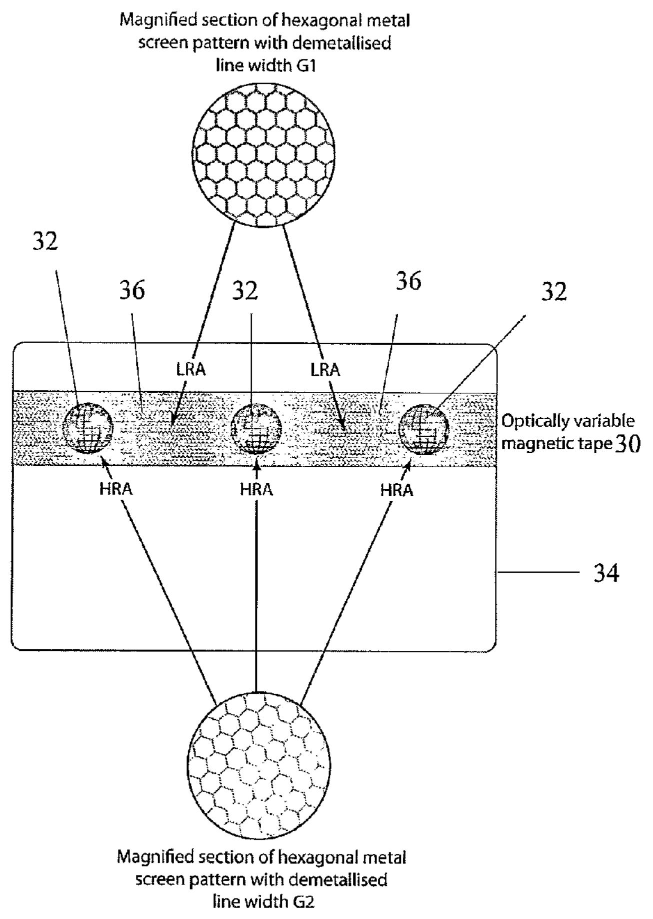
Figure 7. Example of an ATM card with OVM stripe in which the gap is varied to optimise optical and breakdown properties

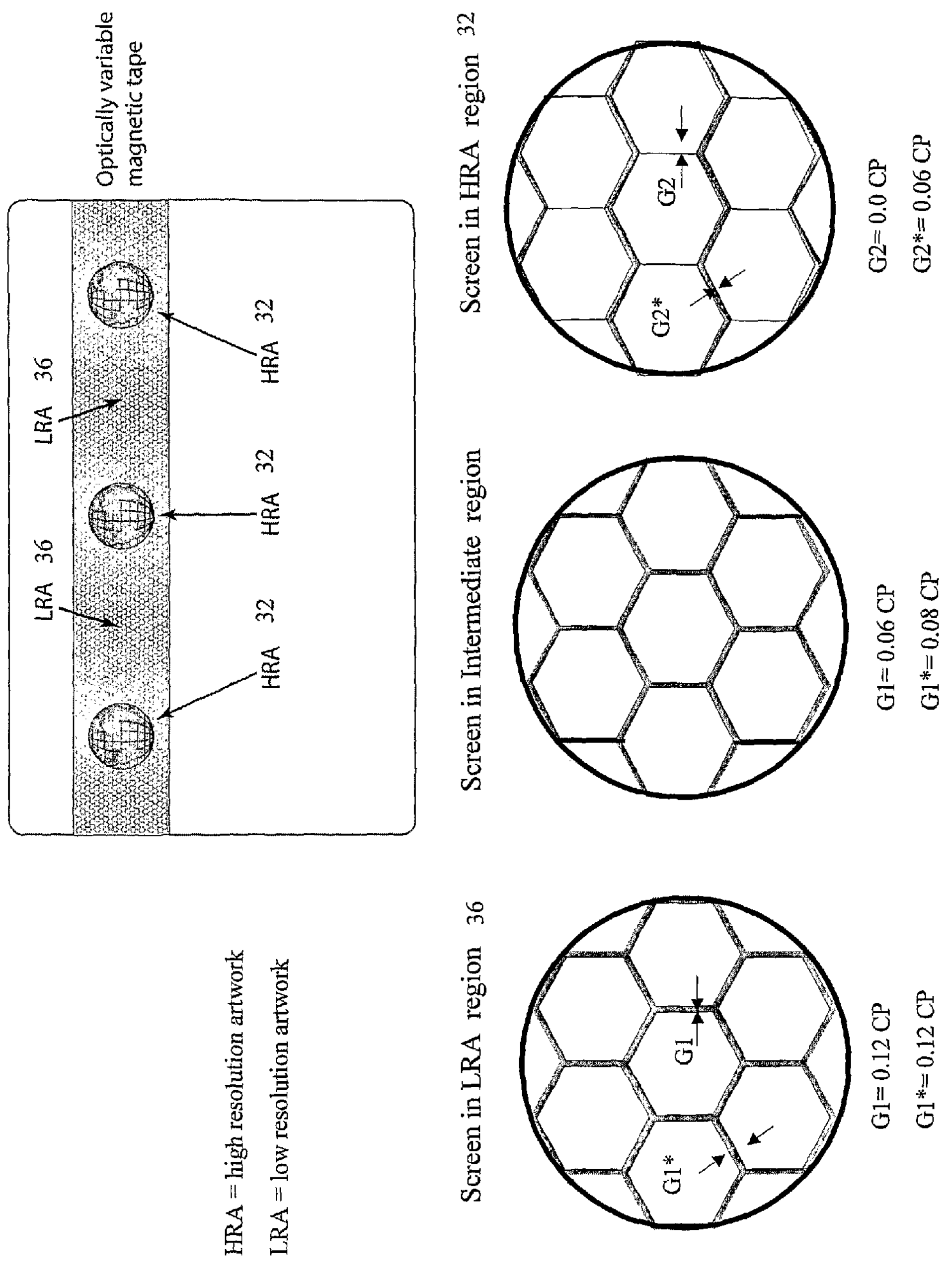
Figure 8. Illustration of a scenario where cell gap G2 is allowed to reduce to zero along the width of the stripe

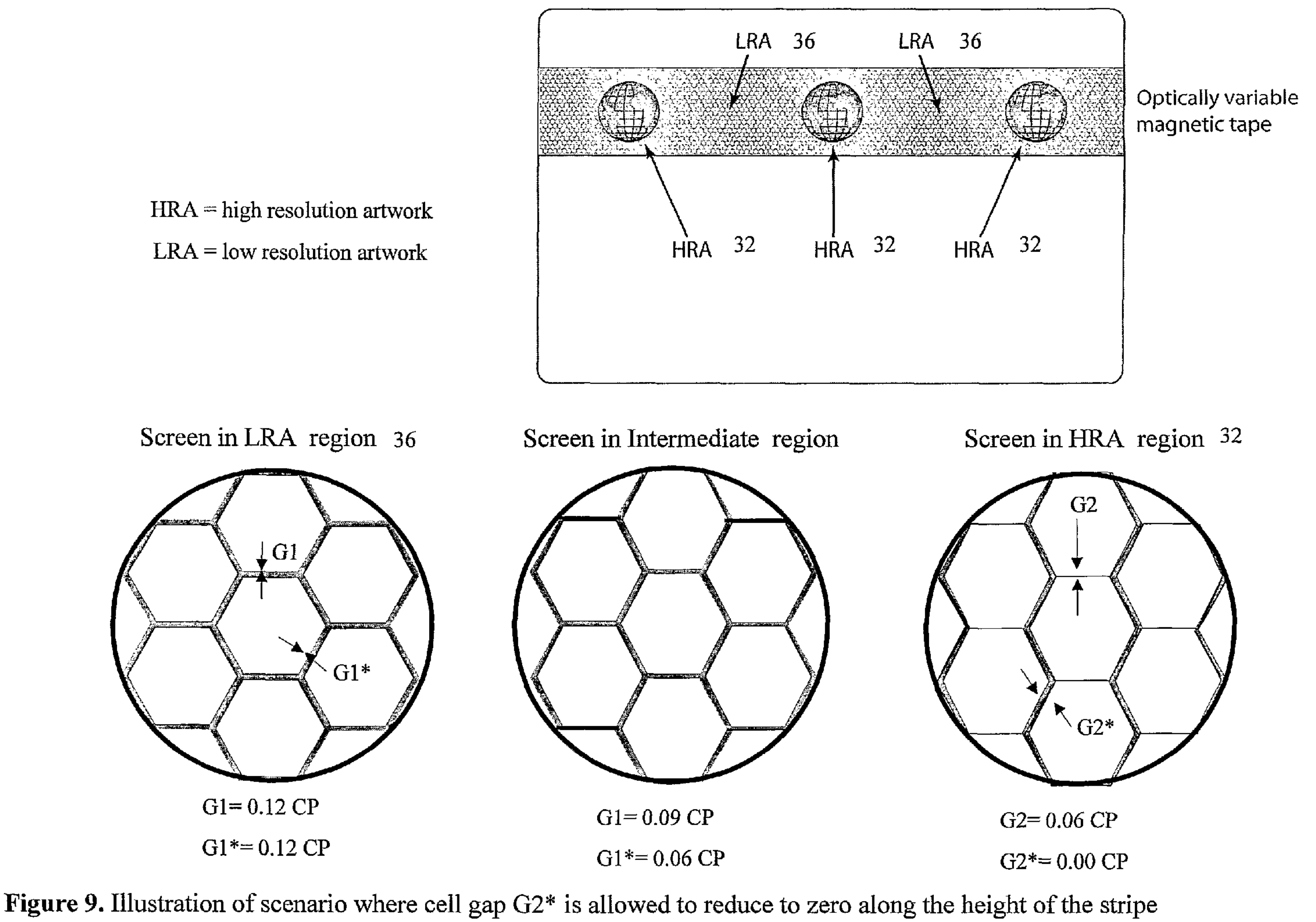
Figure 9. Illustration of scenario where cell gap G2* is allowed to reduce to zero along the height of the stripe

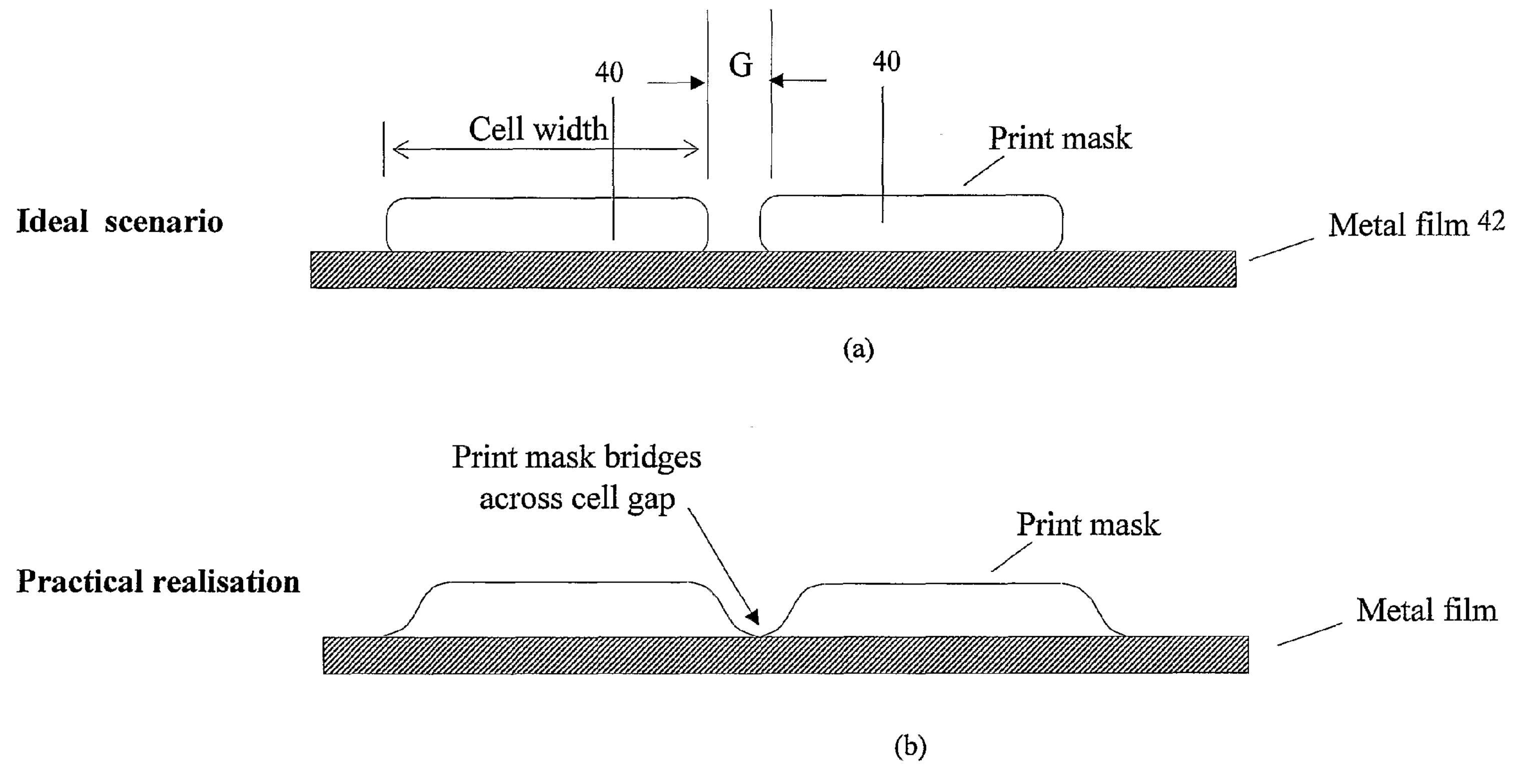
Figure 10. Cross sectional illustration of the print mask patterns for both idealised scenario and that which can occur in practice.

OPTICALLY VARIABLE MAGNETIC STRIPE ASSEMBLY

The current invention is concerned with Optically Variable Magnetic (OVM) stripe assemblies such as are found on financial transaction cards.

It has been conventional practice for some years to provide a magnetic stripe on payment and identity documents such as credit and debit cards, cheque cards, transport tickets, savings books and other security documents. The presence of the magnetic stripe allows such documents to be carriers of machine readable data.

In many cases the documents have been provided with an optically variable security or identification device in the form of a hologram or diffractive image. In order to save space, these have sometimes been combined in one integrated structure, the OVM stripe. This structure may be considered to be a visually secured magnetic data carrier or a hologram which can be personalised with machine readable data. Prior art constructions for OVM stripes have been detailed in U.S. Pat. No. 4,684,795, U.S. Pat. No. 4,631,222 and U.S. Pat. No. 5,383,687. The most significant application of these stripes by value is that in which the stripe is applied to plastic financial transaction cards.

FIG. 1 shows a cross sectional schematic of a conventional prior art OVM stripe applied to a financial or other transaction card as described in the prior art cited above. It has two functional sub-structures:

1. A transparent lacquer layer 1 embossed with a holographic or diffractive surface relief microstructure 2 and coated with a continuous reflection enhancing layer of metal 3, typically aluminium, bonded by an adhesion promoting primer layer 4 to
2. A non-conductive magnetic layer 5, such as a magnetic oxide, that is coated on the primer layer 4. The Magnetic layer 5 is further coated with a heat activated adhesive layer 6 to bond the structure to a plastic card substrate 7. Examples of magnetic oxide are: Barium Ferrite, which is the standard material used for high coercivity magnetic tape for financial cards (4000 Oe), and Ferric Oxide, which is the material used for low coercivity magnetic tape.

In materials science, the coercivity, also called the coercive field, of a ferromagnetic material is the intensity of the applied magnetic field required to reduce the magnetization of that material to zero after the magnetization of the sample has been driven to saturation. Coercivity is usually measured in oersted or ampere/meter units and is denoted $H_c$.

The plastic substrate 7 is typically a tri-laminate structure (not shown) comprising an opaque central polymeric core layer printed with information on either side, laminated between two transparent polymeric overlay sheets.

One drawback of the first generation of OVM stripes is that they included a continuous metallic reflection enhancing layer which is conductive. This has led to problems with electrostatic discharges (ESD) in Automatic Teller Machines (ATM) and in point of sale (POS) magnetic stripe card readers.

An ESD event occurring near to, or within operating electronic equipment can cause failures. This is because the ESD can affect the system through direct discharge into part of the system, or by voltage or current impulses induced in the system wiring or circuit board tracks by electromagnetic coupling. The ESD event creates fast high electrical current transients which can be injected into the electronic circuits, and radiates fast changing electric and magnetic fields, which can induce transient voltage and current impulses in nearby conductors. Such impulses can have sufficient magnitude to change the state of a data line, cause unwanted reset or noise in a signal line.

Electronic systems can behave in unexpected ways during ESD due to the fast waveforms and high ESD current that can be injected into the system. An ESD waveform can generate very high frequencies well into the GHz range.

Once a high frequency transient has entered a system, it is very easy for it to be conducted or radiated within the system until it reaches parts that may be affected by the transient. In preventing ESD interference the main strategies are

- Prevent the ESD entering the system in the first place, if at all possible.
- If this is impossible, the effects may be minimised by reducing the peak current and speed (high frequency content) of the ESD impulse.

The ESD waveform is a function of the source and the load circuits, and so to some extent the latter may be achieved if either the source or load circuits (or both) may be controlled by design.

ESD is caused by the sudden breakdown of the insulating properties of air under high electrical field strength. A large amount of stored charge can be rapidly dissipated by this event, with high currents of many amperes flowing over short timescales as little as a few nanoseconds. The current rise time can be very fast, as little as 0.5 ns, or it may be much longer. The high frequency content f of the waveform is related to the rise time. In a spark discharge between low resistance conductors, peak currents are typically greater than about 0.1 A and can exceed 100 A. The discharge waveform is highly dependent on the source and "load" circuit characteristics and can have unidirectional or oscillatory waveforms.

The human body is a very important source of ESD. The body is a conductive object in electrostatic terms, and can have a variable capacitance commonly up to about 500 pF, although considerably higher capacitances have been measured under some circumstances. Although the body is conductive, it has significant resistance, and this limits the current flow and causes human body ESD waveforms to have a characteristic unidirectional wave shape. The peak discharge current is typically in the range 0.1-10 A with durations of around 100-200 ns. People perceive higher level ESD events as an electrostatic shock. Human sensitivity to ESD is rather variable, but the threshold of feeling ESD shocks is around 3-4 kV (1 kV=1000V) for most people. These shocks are commonly experienced in modern environments where highly insulating footwear and floor materials are in everyday use. The voltages built up on the body can often exceed 5 kV. Dry air conditions encourage electrostatic charge build-up and under these conditions body voltages can exceed 10 kV. The testing of electronic systems susceptibility to a "Human Body Model" (HBM) ESD is a mandatory part of product testing for market suitability in Europe.

There are a number of ways in which a card conductive strip and operator could act as an ESD generator system with a card reader as the "load"

- The conductive strip could have a high voltage and discharge to the card reader
- A charged person holding the card could be in contact with the conductive strip and discharge through the strip to the card reader In the first case (charged strip) the expected result would be a very short duration high current discharge. The source of charging could be rubbing of the card against a person's clothing, or through the card reader mechanism. The energy dissipated into the card reader would be very small because the stripe source is likely to have very low capacitance of 1 pF or less.

The second case would be expected to resemble HBM ESD, however because of the influence of the metallic stripe, the leading edge of the waveform might be expected to be modified by fast rising edges, high peak current and possible oscillations. The energy deposited into the card reader would be much higher (possibly millijoules) as the human body source has significant size and capacitance of the order of 150 pF.

In both cases the waveform would be expected to comprise fast rising edges and these may interfere with an electronic card reader system.

It is instructive to consider a simple electronic model of a person inserting a card into a card reader (FIG. 2). The person has capacitance $C_{HBM}$ and is charged to a voltage V before the action. The person has a body resistance $R_{HBM}$ and capacitance $C_{HBM}$ representing the usual components of the Human Body Model electrostatic discharge source. For ESD test purposes these are conventionally chosen to be 330Ω and 150 pF respectively.

The card modeled has n conductive stripe elements represented by $C_{S1}$ to $C_{Sn}$ separated by spark gaps between them represented by $S_{12}$ to $S_{(n-1)n}$. The capacitance between stripe cells is represented by $C_{S12}$ to $C_{S(n-1)}$. These gaps may spark over if the voltage across them reaches a sufficient level. Across the gap there is also a material giving resistances $R_{S12}$ to $R_{S(n-1)n}$.

When the card is inserted into the card reader it is assumed that at some point the edge of the stripe approaches a metallic part of the reader, where contact or sparkover may occur, represented by $S_{2CR}$. The metal contacting part has capacitance to earth represented by $C_{CR}$ and some parallel discharge path represented by $L_{CR}$ and $R_{CR}$. An additional component $R_{S20}$ has been included. This could represent the resistance of the material that first makes contact (or sparkover) with the card reader. In conventional card designs with the metallic stripe extending to the card edge this may be close to zero resistance.

Before insertion of the card, we assume the capacitances of the person and the card stripe elements are charged to a high voltage V sufficiently high to cause breakdown (sparkover) of a small air gap. The person is making contact with the stripe $C_{S1}$, but not with other stripes. We assume that resistance $R_{S20}=0$. All the capacitances $C_{S1}$ to $C_{Sn}$ have a voltage determined by resistive division of the person's body voltage.

As the card approaches the reader the gap $S_{2CR}$ breaks down and ESD commences. The capacitance $C_{CR}$ discharges through the spark gap rapidly. The peak current flow is limited only by the circuit inductance and spark resistance, which at this stage may be a few hundred ohms. The discharge is expected to have very short fast waveform and high peak current but limited energy. At the card reader, a fast transient is launched into the card reader at the point of ESD. Even if this is a ground track or chassis part, fast transient voltages and currents will be generated which could potentially upset the card reader.

As the capacitance $C_{Sn}$ is discharged the voltage across the gap $S_{(n-1)n}$ increases. At the same time the capacitor $C_{S(n-2)(n-1)}$ begins to discharge through the resistance $R_{S(n-1)n}$, and the voltage and current flow propagates like a wave backwards towards the source. Eventually $C_{HBM}$ starts to discharge through $R_{HBM}$ into $C_{S1}$. If we assume typical HBM components, where $C_{HBM}$ is 150 pF and $R_{HBM}$ is 330Ω, the discharge time given by the product of the component values $C_{HBM}$ $R_{HBM}$ is 50 ns. If the discharge time $C_{S1}$ $R_{S12}$ is > 50 ns, the voltage on $C_{S1}$ is effectively maintained via RHBM.

As the voltage across the spark gaps builds up, for example considering $S_{(n-1)n}$, the gap is likely to spark over if the gap breakdown voltage is exceeded. This breakdown could give another set of fast transients which are injected into the card reader via the existing ESD channel at $S_{2CR}$. If all the gaps become broken down at the same time, the full energy stored on the person's body $C_{HBM}$ can be dumped into the card reader via $R_{HBM}$, $S_{12}$ and $S_{2CR}$.

The following points arise from this analysis

If conductive (metallic) stripe components are used, ESD cannot be avoided as the stripe approaches the card reader and the breakdown voltage of a small gap is exceeded If gaps in the stripes are provided, and breakdown of these gaps cannot be prevented, then a multiple ESD may be generated with further fast transients injected into the card reader, and the likelihood of the entire charge stored on the person contributing to the ESD.

In one aspect of the prior art WO 2007/080389 a small number of discrete breaks in a metal layer, or a pattern of metal dots were used to provide multiple spark gaps in the layer. However, providing breaks can also reduce the visibility of the hologram or other optically variable effect.

The second problematic aspect mentioned above arises when using conductive stripes on highly insulating items such as ATM cards. That is the possibility of charging of the card by triboelectrification. Triboelectrification is a common phenomenon whereby two materials in contact cause charge to be separated from the materials, with one material becoming positively charged and the other negatively charged. This may occur for example when an ATM card comes into contact with the materials of the ATM slot. The highly insulating polymer card material and the stripe may both become charged by this means. The presence of charge on the polymer card gives rise to local electrostatic fields which can induce voltages on nearby conducting parts such as a conducting stripe material. If the stripe could reach a sufficiently high voltage, the card stripe alone could be the source of ESD that could upset sensitive ATM equipment.

This possibility has been addressed in the prior art WO 2007/097775 A1 by fragmenting the metallised stripe material into an array of regular small conductive parts (i.e. cells) such that the amount of electrostatic charge carried on each part is much reduced. Each conductive part was intentionally isolated from the others with non-conductive material in order to block or reduce any discharge into an electronic device. In order to achieve this, physical breaks were introduced into the conductive layer by removing parts of the layer or by selective application of the layer. The conductive cells may be represented in a similar manner to FIG. 2 by omitting the resistive gap components. At any point that the stripe elements make contact with the sensitive electronic equipment, the source capacitance is reduced compared to the full conductive stripe, by being the capacitance of the series-parallel array of cell capacitances $C_{S1}$ to $C_{Sn}$ and intercellular capacitance $C_{S12}$ to $C_{S(n-1)n}$. Again, the problem with breaks on visibility of the hologram etc. arises.

In accordance with a first aspect of the present invention, an optically variable magnetic stripe assembly comprises a magnetic layer;

an optically variable effect generating layer over the magnetic layer; and a metallic reflecting layer adjacent the optically variable effect generating layer and comprising an array of spaced metallic regions shaped as regular polygons.

We have found that with regions or cells shaped as regular polygons, it is possible to control the spacing or gap between regions so as to achieve the required minimum gap to prevent electrostatic breakdown up to about 25 kV while retaining the maximum amount of metal to maximize the brightness of the hologram and minimize the pixelation effect on the hologram image artwork. In contrast, with non-polygonal shapes, such as circles and ellipses, it is inevitable that the gap will vary in a relatively uncontrolled manner between adjacent regions while not achieving the minimum gap possible.

As explained later, we have found that included angles between adjacent edges of the polygon are preferably above 90 degrees, the polygon typically having six or eight sides although four sided polygons are also possible.

In some examples, the metallic regions are separated by an insulating material.

By ‘high’ we mean typically having a resistance>10e10 Ohms/sq. Examples of suitable high resistance materials are thin layers of metal oxides such as TiO2, ZnS & ZrO2 as described in more detail later, and also organic layers such as those based on a vinyl Chloride-Vinyl Acetate polymer resin.

Whilst provision of gaps in the conductive layer serves to fragment the layer and reduce source capacitance, in this aspect of the invention the gaps are preferentially filled with a resistive material designed to allow charge to dissipate in a controlled manner ($R_{S12}$ to $R_{S(n-1)n}$ in FIG. 2). Each conductive cell is in electrical contact with its neighbours via a high resistance. Although the resistance is high, the capacitance of each cell is very small (of the order 1 pF or less) and so the characteristic charge-discharge time of each cell is small. Thus voltages between conductive cells are quickly equalized, preventing electrostatic discharge between conductive cells. When part of the charged stripe comes into contact with ESD sensitive electronic equipment such as the ATM card reader, the charge is released relatively slowly via the network of resistances with low peak ESD current levels, avoiding upset to the equipment.

The regions are typically arranged in a regular array although irregular arrays are also possible. The pitch between adjacent regions typically will not exceed 500 microns.

The spacing between adjacent metallic regions is typically from a few tens (for example 20) microns (micrometers) up to about 150 microns and more preferably from 20-100 microns. The spacing may be constant across the assembly or varied as explained in more detail below.

In accordance with a second aspect of the present invention, an optically variable stripe assembly comprises a magnetic layer;

an optically variable effect generating layer overlying the magnetic layer; and a metallic reflecting layer adjacent the optically variable effect generating layer and comprising a periodic linear or curvilinear grid defining an array of spaced, metallic regions.

Typically the metallic regions are linear, preferably curvilinear, although rectilinear regions could also be used. Further, in other examples, the linear regions could extend in a stepwise manner.

Typically, the metallic reflecting layer is located between the optically variable effect generating layer and a magnetic layer although in some cases the optically variable effect generating layer could be provided between the reflecting layer and the magnetic layer.

The optically variable effect generating layer is typically a surface relief microstructure, for example defining one of a hologram and diffraction grating.

The assembly can be used in a wide variety of security applications but is particularly suited for use with a security document such as a payment or identity document, for example a credit card, debit card, cheque card, ticket, savings book, banknote and the like.

Some examples of optically variable magnetic stripe assemblies according to the invention will now be described with reference to the accompanying drawings, in which:—

FIG. 2 is a simplified electronic model of a person inserting an ATM card into a card reader;

FIG. 3 illustrates an example of a curvilinear metal screen pattern;

FIG. 4 illustrates an elliptical metallic cell or region;

Figure 1:
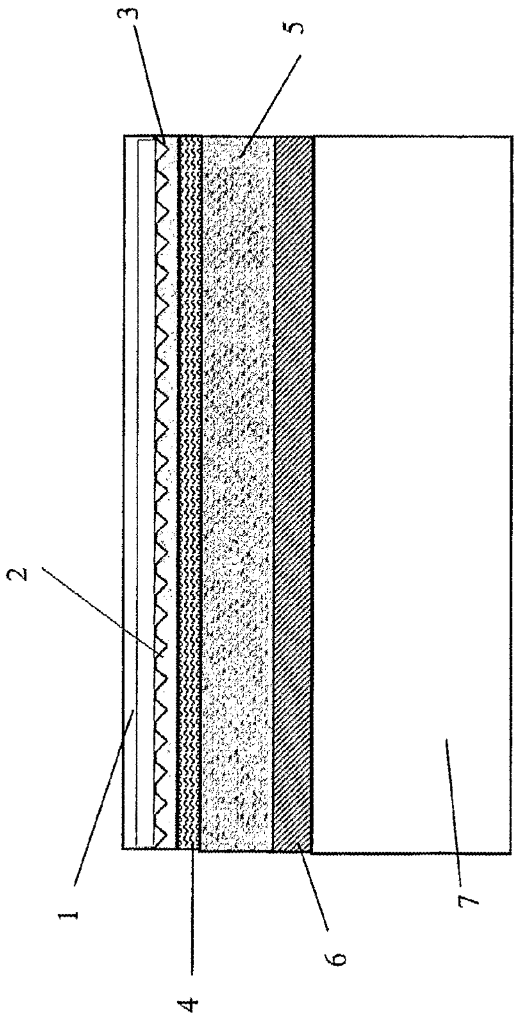
FIG. 1 is a schematic cross-section (not to scale) through a conventional assembly adhered to a card substrate.

FIGS. 5*a* and 5*b* illustrate a hexagonal screen and an elliptical screen respectively;

FIGS. 6*a* and 6*b* illustrate hexagonal screens with different inter-cell gaps;

FIG. 7 illustrates an ATM card with an example of an OVM assembly according to the invention;

FIG. 8 illustrates an ATM card with a second example of an OVM assembly according to the invention;

FIG. 9 illustrates an ATM card with a third example of an OVM assembly according to the invention; and, FIGS. 10*a* and 10*b* illustrate schematically part of a manufacturing process in an idealised scenario and a practical realisation respectively.

The examples to be described are based on the conventional example shown in FIG. 1 but in which the metallic layer 3 has one of a number of different forms.

In a first example, the metallic layer 3 is provided in the form of a one dimensional screen. Specifically in the form of a periodic linear or curvi-linear metal screen or grid pattern of the type shown in FIG. 3. As shown within this figure, the linear metallization pattern repeats or is periodic along the long axis X (i.e. the length of the holomagnetic stripe). The linear regions are preferably unbroken along the height of the stripe (orthogonal to X). The gap between adjacent metal regions remains substantially uniform subject to the normal product variations in the demetallisation process.

In a second preferred embodiment the screen metallization pattern may be provided in the form of a 2-dimensional periodic pattern of regular polygons. It is a requirement of the preferred teaching that only polygonal shapes or cells should be used wherein the sections of demetallisation that define the gap are linear in nature and substantially uniform in width.

Experimentation has confirmed a preferred polygonal shape to be a hexagon. A simpler rectangular cell was found to be less optimal as regards it electrostatic breakdown properties—this we attribute as being due to its smaller corner angle of 90° which results in more intense or concentrated electrostatic field than that generated by the 120° internal corner angle of a hexagonal cell assuming all other factors being equal. This means as the electrostatic potential difference across a cell to cell boundary is progressively increased the rectangular screen unit cell will reach its threshold electrostatic breakdown potential first.

For similar reasons an octagonal cell shape is also suitable, though from a printing/production resolution perspective it should be understood that the more complex polygonal shapes will inevitably increase the overall cell size and thus increase its visibility to the naked eye.

It is helpful to directly compare the merits of a hexagonal cell structure against the simplest cell structures to fabricate, namely simple circles and ellipses. Shown in FIG. 4 is an ellipse cell 20 located within an inner hexagon unit cell 22, wherein both the ellipse and the hexagon would provide a screen pattern with the same repeating pitches (CP) (i.e. the repeat distances along and transverse to the stripe length) and the same minimum gap values between adjacent unit cells (labelled G & G*).

Since these gap values are shared between adjacent cells then a value of ½ G, G* is associated with each individual unit cell. Therefore suppose for manufacturing reasons that the gaps G & G* represent the minimum gap values then if a reflective metal screen pattern is chosen comprised of the elliptical unit cell rather than its equivalent hexagonal unit cell then the dark region area 24 shown in FIG. 4 (generated by subtracting the ellipse from the hexagon) represents the additional loss of reflective metal and more particularly loss of holographic image associated with the elliptical unit cell.

This fact is further illustrated in FIG. 5 which shows the screen pattern generated by said hexagonal (FIG. 5*a*) and elliptical (FIG. 5*b*) unit cells. Due to the absence of reflective metal any holographic image information present within the dark regions will be absent from the image. It is evident from FIG. 5 that a hexagonal unit cell minimizes loss of holographic image over an ellipse or circle since the former minimizes the percentage of metal removed for a given cell gap. The percentage of metal loss for an hexagonal screen can be calculated using the following approximate relationship between the cell pitch (CP) and the gap size (G).

$$\%\ \text{metal removed}=100\times[2G/CP]$$

This is an approximation which is valid in the domain where 0.5Gap<<CP

For example:

if cell pitch CP=488 microns and cell Gap G1=80 microns then % metal removed=33% (0.5G1=0.08CP)

if cell pitch CP=488 microns and cell Gap G2=30 microns then % metal removed=6% (0.5G1=0.03CP)

In particular it is also evident that if we choose to reduce the gap sizes G & G down to zero within certain strictly localized regions of the image then for the case of the hexagonal unit cell we will have a 100% fill factor (no metal removal) and no loss of hologram image or artwork information. However, for the elliptical unit cell even when for the limiting case where the cells touch there will be still a residual area (~10%) of lost metal and therefore information content. This difference in cell fill factor is especially relevant if the hologram image artwork is comprised at least in part of alphanumeric information with character heights comparable in scale to the cell size.

Although the interval gaps could all be the same, within the preferred embodiments there will be regions with different inter cell gaps along the length (i.e. the long axis) of the stripe. In one embodiment the polygonal screen pattern comprises at least two regions with different gap sizes G1 and G2.

Shown in FIG. 6 are examples of how the hexagonal screen patterns pertaining to the larger gap G1 (FIG. 6*a*) and the smaller gap G2 (FIG. 6*b*) would appear in one preferred embodiment. In this embodiment the change in gap size between the different regions occurs as step change across the boundary between the regions.

FIG. 7 shows how the gap width variations defined by (G1, G2) would be applied to the hologram image within an OVM stripe 30 which is located on a typical ATM card 34 for the case of a hexagonal screen pattern.

Within this example, the gap widths (G1, G2) and the variation between them are controlled or modified with the intention of obtaining an optimal compromise between the conflicting requirements of minimizing loss of image brightness and information content whilst ensuring the OVM stripe possesses sufficient electrical breakdown strength and resistance to prevent end-to-end electrical discharge for human body electrostatic potentials up to 15-25 kV.

Specifically the larger gap value G1 is provided in those regions 36 of the hologram image which have the lowest resolution artwork (LRA) or lowest information density and the smaller gap G2 will be provided to coincide with those regions 32 of the hologram image which have the higher resolution artwork (HRA) or higher information density—in this case the detailed cartographic images of the globe, i.e. there is more information per unit area in HRA than LRA. Typically areas of high resolution artwork comprise at least some characters or symbols with a size of less than 1 mm, and areas of low resolution artwork comprise characters or symbols with a size of greater than 1 mm.

In the LRA regions the gap size G1 is preferably in the range 55-150 microns and more preferably in the range 65-100 microns, and in the HRA regions the gap size G2 is preferably less than 50 microns and more preferably in the range 20-50 microns In summary, the minimum gap size G2 will be provided in those areas of the image where it is advantageous or critical to preserve the maximum amount of visual information.

It should be recognized that the example of FIG. 7 could readily be adapted to incorporate the one dimensional linear or curvilinear screen patterns of FIG. 3.

In a further embodiment the gap may be varied in a linear or non linear manner between a larger gap value G1 and a smaller gap value G2, such variation being controlled and pre-determined in nature.

FIG. 8 shows a further example wherein the gap value around the hexagonal unit cell has been allowed to vary. Specifically the vertical linear elements on the left and right hand sides of the cell are defined by the values G1 (LRA region) and G2 (HRA region) whilst the linear elements located on the diagonal sides of the hexagon have the values G1* & G2* respectively. Specifically as the screen pattern passes from a region of LRA to a region of HRA, the vertical gaps are allowed to decrease at a faster rate than the corresponding diagonal gaps such that in the regions of HRA, the value of G2 approaches zero whilst the G2* remains finite (i.e. ½ G1*).

FIG. 9 shows a variation on the preceding embodiment wherein the hexagonal array has been rotated by 90° such that the cell gap G2 is allowed to reduce to zero along the height of the stripe.

In a further embodiment it is permissible to allow both G2 & G2* to fall to zero either through G2,G2* having zero values on the printing plate or cylinder, or by providing values less than 20 micrometers and allowing the process of bridging of the metal layer either side of the gap to reduce the effective gap to zero in some percentage of the cells within the HRA regions.

Experiments conducted by the inventors based on the HBM test regime and involving OVM stripes provided with a small number (<10) of large linear gaps (>1 mm) and also much finer scale screen patterns, confirmed that to prevent ESD occurring at HBM voltages less than 15 kV it is necessary to provide:

An end-to-end resistance (measured by a high voltage resistance meter)>10,000 mega Ohms.

A total end to end gap value>10 mm—i.e 10×1 mm gaps or 200×0.05 mm gaps

It should be appreciated that when say a 10 kV voltage/potential difference is placed across the stripe and the electric breakdown threshold is not exceeded, then a uniform voltage gradient dV/dx will be established along the length of the stripe. Consequently the voltage difference across a 100 micrometer G1 gap will be twice the voltage difference across a 50 micrometer G2 gap thus ensuring that the electric field strength will be equal across both sizes of gap.

Hence both gap sizes will, when present within the same stripe sample have the same breakdown voltage. Given this uniform distribution of voltage or potential difference we can treat the demetalllised gaps as 'spark gaps' and that the effect of these gaps is additive and hence we may say that a human body voltage of 15 kV distributes itself along the stripe as 1.5 kV per mm of gap. [Note in arriving at this model we have not considered Paschen's law which is that the electric field break down value (in volts/micrometer) will significantly increase for gap sizes on the scale of microns when compared to gap sizes on the scale of 100 microns or more].

To understand what in practice will be the minimum consistently achievable gap that can be provided between the cells (without the risk of localized metal 'bridging' between cells) we need to consider in more detail the manufacture of such metallization patterns.

Now the process of demetallisation can be achieved in a number of ways: one method is to print a low molecular weight oil onto the embossed surface of the holographic foil in line and immediately prior to the process of vacuum coating the embossed relief with the desired metal reflective layer (most typically Aluminum). During the vacuum coating process the oil mask rapidly evaporates off preventing metal being deposited in those regions defined by the print mask.

A second method is to print onto the embossed surface a mask (which in this case will form a screen pattern of repeating polygons) comprised of a water soluble resin or ink which has been heavily pigmented with a large inorganic filler particles. When such a mask is then over coated with the vacuum deposited metal reflective layer, the particles of resin or pigment will penetrate through the metal coating and thereby creating aqueous entry points such that when the foil is subsequently immersed or sprayed with water the print mask will dissolve removing the pattern of metal fill supported by it.

A third method is to vacuum deposit the reflective metal film directly on to the embossed holographic relief and then following this process to print the screen pattern of etchant chemical onto the metal surface. The etchant chemical directly removes regions of metal according to the printed pattern. The process of demetallisation being completed by immersion or spraying of the foil with water to stop the reaction process and wash away the slurry of etchant and etched metal. Most commonly the reflective metal is Aluminum and in the case a suitable etchant would be concentrated sodium hydroxide solution.

A fourth method is to vacuum deposit the reflective metal film directly onto the embossed holographic relief and then following this process to print a protective mask or resist onto the metal coating. The exposed metal regions would then be etched away using a suitable etchant such as concentrated sodium hydroxide solution. In this case metal would be retained in those areas covered by the print mask, hence the print mask pattern would be the inverse of that used in method 3.

Finally a fifth method would be to directly laser ablate away the areas of unwanted metal. For example a frequency doubled Neodymium YAG laser providing light wavelengths at 256 nm or 355 nm can provide demetallised line gaps down to 5 micrometers. However currently and for the foreseeable future this process appears too slow and therefore too uneconomic a way of generating high resolution demetallised screens when compared to the print based process previously described.

With reference to methods 1-4, the common requirement is to apply a screen pattern in negative or positive form to the holographic foil using a web based printing roller or cylinder. Now it follows from the inventive teaching that it is desired to provide the highest resolution screen pattern (i.e. smallest cell & gap size) that can be controllably printed onto the foil and then faithfully replicated by the subsequent demetallisation process. The preferred printing method in all four cases will be by gravure which provides the highest print resolution.

However when printing screen cells with pitch dimensions (CP) less than 500 micrometers and wherein we seek to provide gap values less than 100 microns it is necessary to consider the limitations of the gravure process.

Consider FIG. 10*a* which shows an idealized representation of a gravure printing process wherein we are printing cells of print mask 40 on a reflective metal film 42. This metal film would in context follow the profile of the holographic relief; however for simplicity we have assumed it to be planar. Again in the context of the inventive teaching let us assume that the print mask cell width would be of the order of 300-500 micrometers. The height of the print mask 40 is circa 2-10 microns and the gap between cells is in the range 20-100 micrometers. Now in this idealized scenario the perimeter of the cells is well defined (i.e. The cell boundaries are essentially vertical) and therefore so is the gap between cells. With this ideal print capability the minimum value for G1 and more particularly G2 would be set only by the electric breakdown threshold.

Further to this, in order to minimize the visibility of the screen to the naked eye and also its impact on HRA, logic would drive us to towards ever reducing cell sizes and pitch subject to the constraints that $$N\times(\text{average gap size})>10{,}000 \text{ micrometers},$$

where N=the number of cell gaps and $$\text{the \% of metal removed (in total or locally)}<30\%$$

Unfortunately however in practice the gravure printing process does have resolution limits which are directly relevant and comparable to both the required gap and therefore cell size. These limitations are illustrated in FIG. 10*b* (though it should be understand that the relative dimensions of the print mask are not to scale). Now as we approach the resolution limits of the gravure process a lot of factors come into play such as the depth and cut angle of the gravure cells, the surface energy of the metal film, the viscosity of the print mask, the angle of the doctor blade, the pressure with which the print mask ink is applied to the metal film etc. However the net effect of all these variables is to the 'bleed' out the boundaries of the print mask as shown qualitatively in FIG. 10*b*. More particularly as the gap value is progressively reduced we will reach a point where the 'bleed' off from adjacent print cells just bridges the gap. The effect of this bridging is to prevent, either partial or total, demetallisation (metal removal) within the cell gap when the metal film is immersed in an appropriate etchant. This bridging effect tending to be more pronounced along the direction of the foil web.

Practical experimentation by the inventors has confirmed that when using the gravure process to apply either a print mask screen or more directly a screen pattern of etchant (the latter being the complement or inverse of the former) the minimum linear gap that can consistently & reproducibly be provided between cells without the potential bridging between cells is in the region of 60-40 microns. Utilizing a gravure cylinder cut with a screen pattern containing gaps in the region of 40-30 micrometers will present a significant risk of bridging in manufacturing, whilst finally cylinder cell gaps less than 30 micrometers are likely to very likely to bridge.

To give a example of one practical embodiment, consider the case where the screen pitch is of the order of 500 micrometers. To ensure that the percentage metal removal did not exceed 35% in the LRA regions of the hologram stripe image we chose to provide a gap width G1 of 75-80 microns.

However as regards the gap width which applies to the HRA regions we produced samples with the screen gap width G2 having values of 40, 30 & 20 micrometers (the last gap value exhibiting bridging for a large percentage of the cells). For the case where G2=40 microns the percentage area of metal removed equals circa 17%. Whilst for case where G2=30 microns (ignoring the cells that bridged) the percentage area of metal remove equals circa 13%. Finally for G2=20 micrometers more than half the cells bridges at least across the cell divide which was transverse to the foils web direction during printing consequently the percentage of metal removal was less than 5%. All of these samples resisted ESD even when one end of the OVM stripe was brought into contact with a electrostatic voltages as high as 25 kV—the other end being contacted to electrical ground.

Let us consider in more detail the particular screen stripe sample type wherein G1=80 micrometers & G2=30 micrometers. The approximate number of cell gaps N along the full length of OVM stripe=85/(cell repeat) i.e. N=85/0.45~200 gaps.

Now in this case the variation in screen was simply linear hence the average gap value was 55 micrometers and thus the total end to end gap, which=N×(average gap size), =11 mm which exceeds our 10 mm total gap requirement.

Also the measured end-to-end resistance of the stripe was 100,000 mega Ohms giving a HBM discharge time of the order of 15 s. In other words the end to end discharge time (below threshold of electrical breakdown) is so long that it is unlikely to affect the operation of an ATM or magnetic swipe terminal.

Whilst for the sample type G1=80 and G2=20 micrometers, the screen cells have an average gap of 40-45 microns, thus giving a total end to gap value of around 8-9 mm—this is just below our 10 mm preferred value however this factor was countered by a measured end-to-end resistance of 80,000 mega ohms, which gives a HBM discharge time of around 12 seconds which is still, from the view point of electrical interference in magnetic swipe terminals and ATM's, a long discharge time.

Further examples of the measured end-to-end resistance $R_e$ (measured at 5 kV) of the different sample types and their associated decay times r are given in Table 1. For reference we also show the decay time of the a first generation OVM stripe and also that of a test sample containing only 2 large gaps (5 mm).

Consider now the situation where we decide to reduce the screen cell repeat or pitch is reduced by ⅔ to 0.35 mm. To ensure that we provide the same total end to end gap and also provide the same percentage area of metal removal then we should also scale down the gap sizes by the same factor. If we take the first example above, where G1=80 microns and G2=30 microns, then the new value for G1=50-55 microns. This gap size as we have discussed should be readily provided without the risk of print mask bridging. However our scope for reducing the gap size in those regions of the screen which correspond HRA will be very limited by the onset of bridging. The approach to screen variation shown in FIGS. 8 &9 then becomes relevant. In that we lift the restriction of providing a uniform gap on all sides of the hexagon and instead choose to have different gap values for the vertical and diagonal elements of the hexagon i.e. G & G*.

For example we may follow the practice of FIG. 8 wherein we allow G2 to have values less than 30 micrometers but we ensure that G2* remains at 40 microns. Hence we allow a value for G2 which accepts a degree of bridging (partial or complete) across the vertical elements i.e. the cells become unified along the stripe direction in the regions of HRA but the cells remain broken in the vertical direction thus ensuring that even within the HRA there remains a screen pattern which keeps the electrical capacitance low in that region. For example, for an OVM stripe 8.4 mm in height there will be 25 cell G2* gaps (circa)—this means that the effective capacitance in that region will be $1/25^{th}$ of the value it would have had the cells been allowed to merge in both axes in the HRA regions of the stripe.

We could also configure the screen pattern as illustrated in FIG. 9, i.e rotated by 90° from that shown in FIG. 8, such that G2* is fixed at 40 micrometers and we allow G2 to have sub 30 micrometers values. In this embodiment it should be recognized that the screen configuration of FIG. 8 will provide a lower end to end resistance and HBM breakdown voltage when compared to the embodiment shown in FIG. 9 however the former will provide greater resistance to tribo-electric charging and discharge associated with the card being swiped through a magnetic swipe terminal with a plastic base to the card slot.

In a further embodiment (not shown) the cell gap remains finite (i.e. 50-150 microns as required) but abruptly reduces to zero in those regions defined by the hologram image or artwork elements.

This means we only have a demetallised screen pattern in areas of the OVM stripe where there is no image elements present, and there is full metal coverage in the image areas (i.e. screen void areas). This requires the fully metallised areas and the hologram image areas to be precisely registered to a tolerance along either axis which depending on process capability may vary from +/−10 microns to +/−750 microns but most preferably +/−100 to +/−500 microns.

The metal layer in the present invention is not limited to a particular material and examples include Al, Cu, Al—Cu alloy, Ni, Cr or Ni—Cr alloy.

In a further embodiment two different coloured metal enhancing layers can be used in the one device. For example aluminiumn and copper. Obviously other combinations of metal or metal alloys can be used.

It should be appreciated that the device could be further enhanced by the incorporation of additional materials into or between appropriate layers. For example within the transparent lacquer layer or the adhesion promoting primer layer. Typical materials are those that react to an external stimulus for example, fluorescent, phosphorescent, infrared absorbing, thermochromic, photochromic, magnetic, electrochromic, conductive and piezochromic materials.

In a still further embodiment (not shown) a very thin semi-transparent layer of metal is provided on top of the screen metallised layer. This additional metal layer conceals the gaps in the screen metallised layer and also prevents the loss of the holographic image associated with the use of a metallised screen. Such a thin layer will have a much higher resistance than an opaque metal layer but will still appear substantially reflective. A preferred example of a material for this thin metallsied layer is Ni—Cr alloy due to its resistive properties. The thin semi-transparent metal layer is less than 25 nm thick and preferably in the range 5-10 nm.

In yet a further embodiment a non-conducting reflection enhancing layer is provided underneath or above the screen metallised layer. A first example of a suitable alternate reflection-enhancing layer is a coating of a material which has an optical index of refraction of at least 2.0 and in electrical terms is such a poor conductor that it may be classified as an insulator (in electromagnetic theory known as a dielectric).

An index of refraction of 2.0 or more is usually necessary to ensure that there is a minimum refractive index change of 0.5 or more between the embossed lacquer layer which typically has a index of refraction of around 1.4 and the dielectric reflection coating. The skilled practitioner will know both from experience and the application of Fresnel equations for reflection efficiency that this refractive index step will provide a holographic or diffractive image of acceptable visual brightness under most ambient lighting conditions.

Suitable dielectric materials with a refractive index of 2.0, with good optical transparency and amenable to coating by the processes of vacuum deposition are $TiO_2$, ZnS & $ZrO_2$—though there a number of other suitable metal oxide materials.

Such materials are known within the optical coatings industry as high refractive index (HRI) materials.

These materials are deposited with a thickness range between 0.07 micrometers and 0.15 micrometers, depending on the particular dielectric chosen and the optical effect required. The use of such a material in combination with polygonal screen metallised layer ensures that the holographic images coincident with the gaps in the screen metallised layer remain visible.

The designs generated in the HRA and LRA regions may take any form but are preferably in the form of images such as patterns, symbols and alphanumeric characters and combinations thereof. The designs can be defined by patterns comprising solid or discontinuous regions which may include for example line patterns, dot structures and geometric patterns. Possible characters include those from non-Roman scripts of which examples include but are not limited to, Chinese, Japanese, Sanskrit and Arabic.

TABLE 1

Example of variation of end-to-end resistance and decay time with metalisation pattern and gap length.

| Stripe pattern | G1 (mm) | G2 (mm) | End to end resistance $R_e$ (Ω) | Decay time τ (seconds) |
|---|---|---|---|---|
| Continuous metallised. (Prior art - first generation OVM stripe) | n/a | n/a | $3 \times 10^8$ | 0.045 |
| 2 × 5 mm demetallised gaps (Prior art) | n/a | n/a | $5 \times 10^9$ | 0.75 |
| Linear screen pattern | 0.060 | 0.020 | $3 \times 10^{10}$ | 4.5 |
| Hexagonal screen pattern | 0.060 | 0.040 | $4 \times 10^{10}$ | 6.0 |
| Hexagonal screen pattern | 0.080 | 0.020 | $8 \times 10^{10}$ | 12 |
| Hexagonal screen pattern | 0.080 | 0.030 | $1 \times 10^{11}$ | 15 |
| Hexagonal screen pattern | 0.080 | 0.040 | $1.5 \times 10^{11}$ | 23 |

TABLE 1-continued

Example of variation of end-to-end resistance and decay time with metalisation pattern and gap length.

| Stripe pattern | G1 (mm) | G2 (mm) | End to end resistance $R_e$ (Ω) | Decay time τ (seconds) |
|---|---|---|---|---|
| Hexagonal screen pattern | 0.080 | 0.080 | $2.2 \times 10^{11}$ | 33 |

The invention claimed is:

1. An optically variable magnetic stripe assembly comprising a magnetic layer; an optically variable effect generating layer over the magnetic layer; and a metallic reflecting layer adjacent the optically variable effect generating layer and comprising an array of spaced metallic regions shaped as regular polygons.

2. The assembly according to claim 1, wherein each polygon has at least four sides, preferably six or eight sides.

3. The assembly according to claim 1, wherein the metallic regions are separated by an insulating material.

4. The assembly according to claim 3, wherein the insulating material has a resistance greater than 10e10 Ohms/sq.

5. The assembly according to claim 1, wherein all the metallic regions have the same shape.

6. The assembly according to claim 1, wherein the regions are arranged in a regular array.

7. The assembly according to claim 1, wherein a pitch between adjacent regions does not exceed 500 microns.

8. The assembly according to claim 1, wherein the spacing between the adjacent regions varies across the magnetic layer.

9. The assembly according to claim 8, wherein the magnetic layer comprises an elongate strip, the spacing between metallic regions varying along the length of the strip.

10. The assembly according to claim 9, wherein the spacing between adjacent regions varies in a non-linear manner.

11. The assembly according to claim 1, wherein the optically variable effect generating layer generates an image or images with varying resolution or information density.

12. The assembly according to claim 11, wherein the regions are arranged in a regular array, and wherein the spacing between adjacent regions is smaller in relation to those regions in alignment with an image with relatively high resolution or relatively high information density and is larger in alignment with an image with relatively low resolution or relatively low information density.

13. The assembly according to claim 1, wherein a first spacing between one side of the metallic region and a region adjacent said one side is different from a second spacing between another side of the metallic region and a region adjacent said other side.

14. The assembly according to claim 1, wherein the optically variable effect generating layer generates an image or images with varying resolution or information density, and wherein a spacing between the metallic regions decreases at a faster rate in one dimension along the magnetic layer than in another dimension, the one dimension extending between areas of low and high resolution images or low and high density of information content.

15. The assembly according to claim 1, wherein the spacing between adjacent metallic regions is in the range 20-150 microns.

16. The assembly according to claim 15, wherein the first spacing is in the range 55-150 μm, preferably 65-100 μm, and the second spacing is no more than 50 μm.

17. The assembly according to claim 1, wherein the metallic reflecting layer is located between the optically variable effect generating layer and the magnetic layer.

18. The assembly according to claim 1, wherein the optically variable effect generating layer is a surface relief microstructure.

19. The assembly according to claim 1, wherein the optically variable effect generating layer defines one of a hologram and diffraction grating.

20. A security document provided with an optically variable magnetic stripe assembly according to claim 1.

21. The security document according to claim 20, the security document comprising a payment or identity document including any one of at least a credit card, debit card, cheque card, ticket, savings book or banknote.

* * * * *